(12) United States Patent
Kurimura et al.

(10) Patent No.: US 10,994,301 B2
(45) Date of Patent: May 4, 2021

(54) METHOD FOR CONSTRUCTING ABRADABLE COATING, AND SHROUD

(71) Applicant: MITSUBISHI HEAVY INDUSTRIES AERO ENGINES, LTD., Aichi (JP)

(72) Inventors: Takayuki Kurimura, Tokyo (JP); Mineaki Matsumoto, Tokyo (JP); Tadayuki Hanada, Aichi (JP); Azusa Tamugi, Aichi (JP)

(73) Assignee: MITSUBISHI HEAVY INDUSTRIES AERO ENGINES, LTD., Aichi (JP)

( * ) Notice: Subject to any disclaimer, the term of this patent is extended or adjusted under 35 U.S.C. 154(b) by 158 days.

(21) Appl. No.: 16/092,247

(22) PCT Filed: Jun. 6, 2017

(86) PCT No.: PCT/JP2017/020921
§ 371 (c)(1),
(2) Date: Oct. 9, 2018

(87) PCT Pub. No.: WO2018/029957
PCT Pub. Date: Feb. 15, 2018

(65) Prior Publication Data
US 2019/0143368 A1    May 16, 2019

(30) Foreign Application Priority Data
Aug. 10, 2016   (JP) .............................. JP2016-157802

(51) Int. Cl.
*B05D 1/38* (2006.01)
*B05D 3/06* (2006.01)
(Continued)

(52) U.S. Cl.
CPC .................. *B05D 1/38* (2013.01); *B05D 3/02* (2013.01); *B05D 3/06* (2013.01); *B05D 3/10* (2013.01);
(Continued)

(58) Field of Classification Search
CPC ........................................................ B05D 1/38
(Continued)

(56) References Cited

U.S. PATENT DOCUMENTS 5,156,697 A   10/1992   Bourell et al.
6,057,047 A    5/2000   Maloney
(Continued)

FOREIGN PATENT DOCUMENTS

JP   H03214440 A   9/1991
JP   H07502938 A   3/1995
(Continued)

OTHER PUBLICATIONS

Extended European Search Report for European Application No. 17839032.4 dated Mar. 19, 2019; 11pp.
(Continued)

*Primary Examiner* — Tabatha L Penny
(74) *Attorney, Agent, or Firm* — Hauptman Ham, LLP

(57) ABSTRACT

A method for constructing an abradable coating comprises: a slurry layer formation step S2 in which a slurry layer 31 is formed on the surface of a base material 30 using a slurry containing ceramic particles and a solvent; a calcination step S3 in which the slurry layer 31 formed on the surface of the base material 30 is sintered and a sintered layer 35 to be a portion of an abradable coating layer 22 is formed; and a slurry removal step S5 in which extraneous slurry is removed after the abradable coating layer 22 has been formed on the surface of the base material 30, a plurality of the sintered layers 35 having been laminated in the abradable coating layer 22 through a plurality of repeated cycles of the slurry layer formation step S2 and the calcination step S3.

7 Claims, 6 Drawing Sheets

(51) Int. Cl.

| | |
|---|---|
| B05D 3/10 | (2006.01) |
| B05D 7/24 | (2006.01) |
| B05D 3/02 | (2006.01) |
| C04B 41/87 | (2006.01) |
| C04B 41/89 | (2006.01) |
| C23C 4/10 | (2016.01) |
| C23C 26/00 | (2006.01) |
| F01D 11/12 | (2006.01) |
| F02C 7/24 | (2006.01) |
| F02C 7/28 | (2006.01) |
| F01D 25/00 | (2006.01) |
| C23C 28/00 | (2006.01) |
| F02C 7/00 | (2006.01) |
| C04B 38/06 | (2006.01) |
| B33Y 10/00 | (2015.01) |
| C23C 28/04 | (2006.01) |
| C04B 35/622 | (2006.01) |
| C23C 24/08 | (2006.01) |
| C04B 35/195 | (2006.01) |
| C04B 35/486 | (2006.01) |
| C04B 35/111 | (2006.01) |
| C04B 35/16 | (2006.01) |
| C04B 111/00 | (2006.01) |

(52) U.S. Cl.
CPC ............... *B05D 7/24* (2013.01); *B33Y 10/00* (2014.12); *C04B 35/111* (2013.01); *C04B 35/16* (2013.01); *C04B 35/195* (2013.01); *C04B 35/486* (2013.01); *C04B 35/62222* (2013.01); *C04B 38/067* (2013.01); *C04B 38/068* (2013.01); *C04B 41/87* (2013.01); *C04B 41/89* (2013.01); *C23C 4/10* (2013.01); *C23C 24/08* (2013.01); *C23C 24/082* (2013.01); *C23C 26/00* (2013.01); *C23C 28/00* (2013.01); *C23C 28/04* (2013.01); *C23C 28/042* (2013.01); *F01D 11/12* (2013.01); *F01D 25/00* (2013.01); *F02C 7/00* (2013.01); *F02C 7/24* (2013.01); *F02C 7/28* (2013.01); *B05D 2451/00* (2013.01); *C04B 2111/00482* (2013.01); *C04B 2235/3224* (2013.01); *C04B 2235/5436* (2013.01); *C04B 2235/5472* (2013.01); *C04B 2235/665* (2013.01); *C04B 2235/775* (2013.01)

(58) Field of Classification Search
USPC ..................................................... 427/376.1
See application file for complete search history.

(56) References Cited

U.S. PATENT DOCUMENTS

| | | | |
|---|---|---|---|
| 6,217,816 B1* | 4/2001 | Tang | .......................... B28B 1/00 |
| | | | 264/497 |
| 2001/0004436 A1 | 6/2001 | Chasripoor et al. | |
| 2003/0054196 A1 | 3/2003 | Lau et al. | |
| 2004/0137259 A1 | 7/2004 | Pabla et al. | |
| 2005/0003172 A1 | 1/2005 | Wheeler et al. | |
| 2008/0008894 A1* | 1/2008 | Abdo | .................... C04B 35/522 |
| | | | 428/469 |
| 2015/0240652 A1 | 8/2015 | Lee et al. | |
| 2015/0354393 A1 | 12/2015 | Lipkin et al. | |
| 2016/0265367 A1 | 9/2016 | Rosenzweig et al. | |
| 2016/0311726 A1 | 10/2016 | Kirby | |
| 2016/0312628 A1 | 10/2016 | Kirby | |
| 2018/0363487 A1 | 12/2018 | Kurimura et al. | |

FOREIGN PATENT DOCUMENTS

| | | | | |
|---|---|---|---|---|
| JP | H11264059 A | 9/1999 | | |
| JP | 2001234707 A | 8/2001 | | |
| JP | 2010151267 A | 7/2010 | | |
| JP | 2016006321 A | 1/2016 | | |
| JP | 2016137708 A | 8/2016 | | |
| JP | 2017509821 A | 4/2017 | | |
| WO | 2015126476 A2 | 8/2015 | | |
| WO | WO-2015126476 A2 * | 8/2015 | ........... | C04B 41/009 |
| WO | 2015130362 A2 | 9/2015 | | |
| WO | 2015130522 A1 | 9/2015 | | |
| WO | 2016077250 A1 | 5/2016 | | |
| WO | 2017134976 A1 | 8/2017 | | |

OTHER PUBLICATIONS

Huang-Jan Hsu et al. "Development of Maskless-Curing Slurry Stereolithography for Fabricating High Strength Ceramic Parts," Applied Mechanics and Materials, Jan. 3, 2014, vol. 575, pp. 214-218, Trans Tech Publications, Switzerland; 6pp.

Office Action for Japanese Application No. 2016-157802 dated Mar. 31, 2020; 8pp.

International Search Report and Written Opinion for International Application No. PCT/JP2017/020921 dated Sep. 5, 2017; 46pp.

* cited by examiner

METHOD FOR CONSTRUCTING ABRADABLE COATING, AND SHROUD

RELATED APPLICATIONS

The present application is a National Phase of International Application Number PCT/JP2017/020921 filed Jun. 6, 2017 and claims priority to Japanese Application Number 2016-157802 filed Aug. 10, 2016.

TECHNICAL FIELD

The present invention relates to a method for constructing an abradable coating to be formed on a surface of a base material, such as a shroud, and a shroud.

BACKGROUND ART

In the related art, a coating which includes a bond coat to be formed on a surface of a base material and a ceramic layer to be formed on the bond coat, has been known as a coating to be formed on the base material (for example, refer to PTL 1). The ceramic layer is formed in a predetermined pattern by plasma spraying that is performed on the base material while a mask is used.

CITATION LIST

Patent Literature

[PTL 1] Specification of U.S. Unexamined Patent Application Publication No. 2005/0003172

SUMMARY OF INVENTION

Technical Problem

However, since the mask where slits are formed in a predetermined pattern is used in PTL 1, there is a possibility that the slits of the mask are closed (clogged) as plasma spraying is performed. In this case, since the mask is more often replaced, it is difficult to improve construction efficiency.

An object of the present invention is to provide a method for constructing an abradable coating which can streamline the construction of an abradable coating having high free-cutting ability, and a shroud.

Solution to Problem

A method for constructing an abradable coating the present invention includes: a slurry layer formation step of forming a slurry layer on a surface of a base material by using a slurry that contains ceramic particles and a solvent; a calcination step of forming a sintered layer to be a portion of an abradable coating layer by sintering the slurry layer that is formed on the surface of the base material; and a slurry removal step of removing extraneous slurry after forming the abradable coating layer in which a plurality of the sintered layers are laminated on the surface of the base material after repeating the slurry layer formation step and the calcination step a plurality of times.

According to the configuration, after the slurry layer is formed on the base material, the sintered layer is formed by appropriately sintering the slurry layer, the sintered layer is laminated by repeating the formation of the sintered layer, and accordingly, it is possible to form the abradable coating layer on the surface of the base material. At this time, even when the surface of the base material is a curved surface, a concave surface, or a convex surface, by using the slurry, it is possible to form a slurry layer which becomes a uniform layer with respect to the surface of the base material. Therefore, similar to the related art, since a mask and the like do not need to be used and the abradable coating layer having high free-cutting ability can be formed by simple steps, the construction of the abradable coating can be streamlined. In addition, in the calcination step, the slurry layer is sintered using, for example, a laser, a burner, a microplasma or the like.

In addition, it is preferable that the ceramic particles include coarse particles having a large particle size and fine particles having a particle diameter smaller than that of the coarse particles, when the slurry layer formed to be in contact with the surface of the base material is set as a first slurry layer, and the slurry layer formed to be in contact with the first slurry layer is a second slurry layer, the slurry used in the first slurry layer has a smaller proportion of the coarse particles than that of the slurry used in the second slurry layer.

According to the configuration, by using slurry having a small proportion of the coarse particles and a large proportion of the fine particles in the first slurry layer, the sintered layer after sintering the first slurry layer can be formed to have high adhesiveness on the base material. This is because the fine particles enter the boundary between the surface of the base material and the sintered layer and are sintered. In addition, by using slurry having a large proportion of the coarse particles and a small proportion of the fine particles in the second slurry layer, the sintered layer after sintering the second slurry layer can be formed to have high free-cutting ability. This is because, since a large amount of coarse particles are contained in the sintered layer, many spaces are formed between the coarse particles.

In addition, it is preferable that the slurry layer formed to be in contact with the surface of the base material is a first slurry layer, and when the slurry layer formed to be in contact with the first slurry layer is a second slurry layer, the thickness of the first slurry layer is formed to be thinner than that of the second slurry layer.

According to the configuration, since the first slurry layer can be made thin, heating in the thickness direction of the first slurry layer can be appropriately performed in the calcination step, and the sintered layer can be appropriately formed. In addition, since the sintered layer (first sintered layer) obtained by sintering the first slurry layer can be made thin and the sintered layer (second sintered layer) obtained by sintering the second slurry layer can be made thick, it is possible to increase the thickness of the second sintered layer having high free-cutting ability in the thickness direction of the abradable coating layer and to further improve the free-cutting ability.

Further, in the calcination step, it is preferable that the slurry layer is irradiated with laser and the slurry layer is sintered.

According to the configuration, it is possible to form the sintered layer having a shape with high accuracy by using the laser.

In addition, it is preferable that, when the slurry layer formed to be in contact with the surface of the base material is a first slurry layer, and the calcination step of sintering the first slurry layer is a first calcination step, a focal position of the laser is set to be the surface of the abradable coating layer, and, in the first calcination step, in an off-focus state where the focal position of the laser is separated from the surface of the first slurry layer, the first slurry layer is irradiated with the laser, and the first slurry layer is sintered.

According to the configuration, by achieving a state where the focal position of the laser is set on the surface of the abradable coating layer, the focal position of the laser is in an off-focus state being separated from the surface of the first slurry layer. In addition, by irradiating the first slurry layer with the laser in this state, it is possible to irradiate a wide region of the first slurry layer with the laser, and thus, the sintered layer can be formed with a small number of passes. In addition, since there is no need to move the focal position of the laser, it is possible to streamline the calcination step.

Further, it is preferable that, in the slurry removal step, by using the solvent, the slurry is removed.

According to the configuration, the slurry removed by the solvent can be reused as slurry usable in the slurry layer formation step by appropriately adding or drying ceramic particles.

Further, it is preferable that the slurry further contains a pore forming material.

In addition, it is preferable that the pore forming material contains at least one of a carbon-based material and a polymer-based material.

According to the configuration, since multiple pores can be formed in the abradable coating layer by oxidation or volatilization of the pore forming material at the time of sintering the slurry layer, it is possible to further improve the free-cutting ability.

Further, it is preferable that an inspection step of inspecting the abradable coating layer formed on the base material after the slurry removal step is further provided.

According to the configuration, it is possible to inspect whether or not the abradable coating layer is appropriately formed.

In addition, it is preferable that a porous ceramic layer is formed on the surface of the base material, and in the slurry layer formation step, the slurry layer is formed on the ceramic layer by using the slurry.

According to the configuration, the ceramic layer and the abradable coating layer can be firmly joined to each other. In other words, since the ceramic layer is porous, as the solvent contained in the slurry enters the pores of the ceramic layer, the ceramic particles are flocculated on an interface between the ceramic layer and the slurry, and as the slurry is calcinated in this state, the ceramic layer and the abradable coating layer are firmly joined to each other.

In a shroud of the present invention which has an abradable coating layer formed on a surface of a base material facing a rotor blade, the abradable coating layer has a plurality of laminated sintered layers, a plurality of the sintered layers obtained by sintering ceramic particles that contain coarse particles having a large particle diameter and fine particles having a smaller particle diameter than that of the coarse particles, include a first sintered layer which is the sintered layer formed on the surface of the base material, and a second sintered layer which is the sintered layer formed to be in contact with the first sintered layer, and a proportion of the coarse particles contained in the first sintered layer is smaller than the proportion of the coarse particles contained in the second sintered layer.

According to the configuration, as the proportion of the coarse particles decreases and the proportion of the fine particles increases in the first sintered layer, the first sintered layer can be formed to have high adhesiveness on the base material. This is because the fine particles enter the boundary between the surface of the base material and the first sintered layer and are sintered. In addition, as the proportion of the coarse particles increases and the proportion of the fine particles decreases in the second sintered layer, the second sintered layer can be formed to have high free-cutting ability. This is because, since a large amount of coarse particles are contained in the sintered layer, many spaces (pores) are formed between the coarse particles.

In a shroud of the present invention which has an abradable coating layer formed on a surface of a base material facing a rotor blade, the abradable coating layer has a plurality of laminated sintered layers, a plurality of the sintered layers include a first sintered layer which is the sintered layer formed on the surface of the base material, and a second sintered layer which is the sintered layer formed to be in contact with the first sintered layer, and the thickness of the first sintered layer is thinner than that of the second sintered layer.

According to the configuration, since the first sintered layer can be made thin and the second sintered layer can be made thick, it is possible to increase the thickness of the second sintered layer having high free-cutting ability in the thickness direction of the abradable coating layer and to further improve the free-cutting ability.

DESCRIPTION OF EMBODIMENTS

An embodiment of the present invention will be described in detail below with reference to the drawings. The present invention is not limited by this embodiment. Further, components of the following embodiment include components that can be substituted and easily supposed by those skilled in the art or substantially the same components as the components of the following embodiment. Furthermore, components described below can be appropriately combined. In a case where there are a plurality of embodiments, the respective embodiments can also be combined.

Embodiment 1

Figure 1:
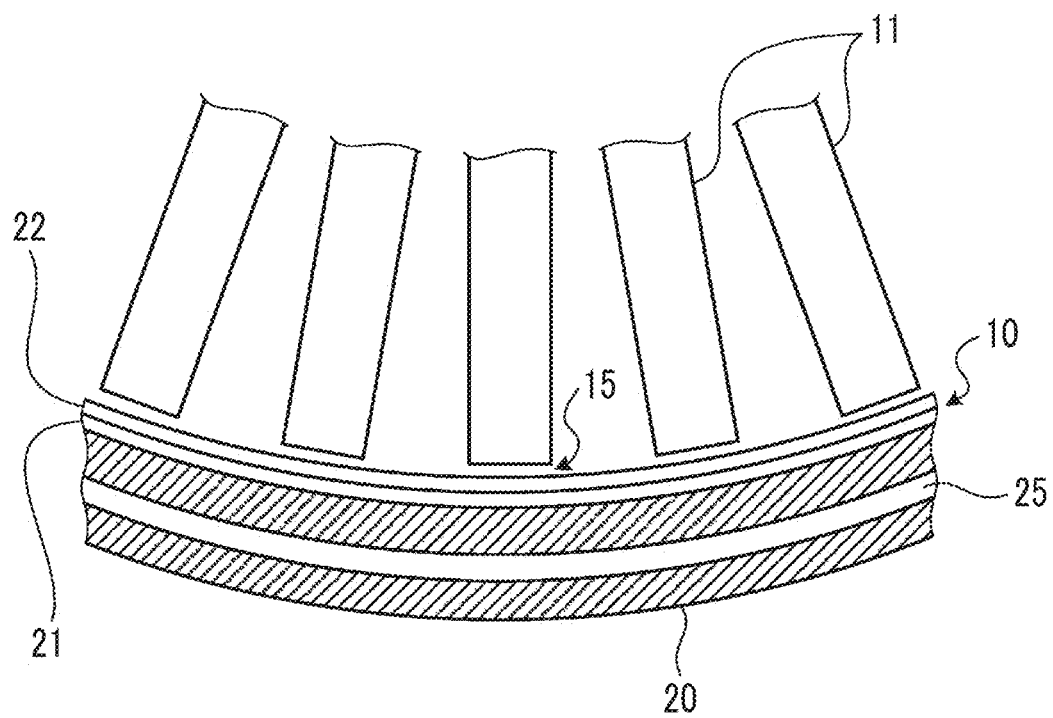
FIG. 1 is a schematic configuration view of a shroud on which an abradable coating is constructed by a construction method according to Embodiment 1.
Figure 2:
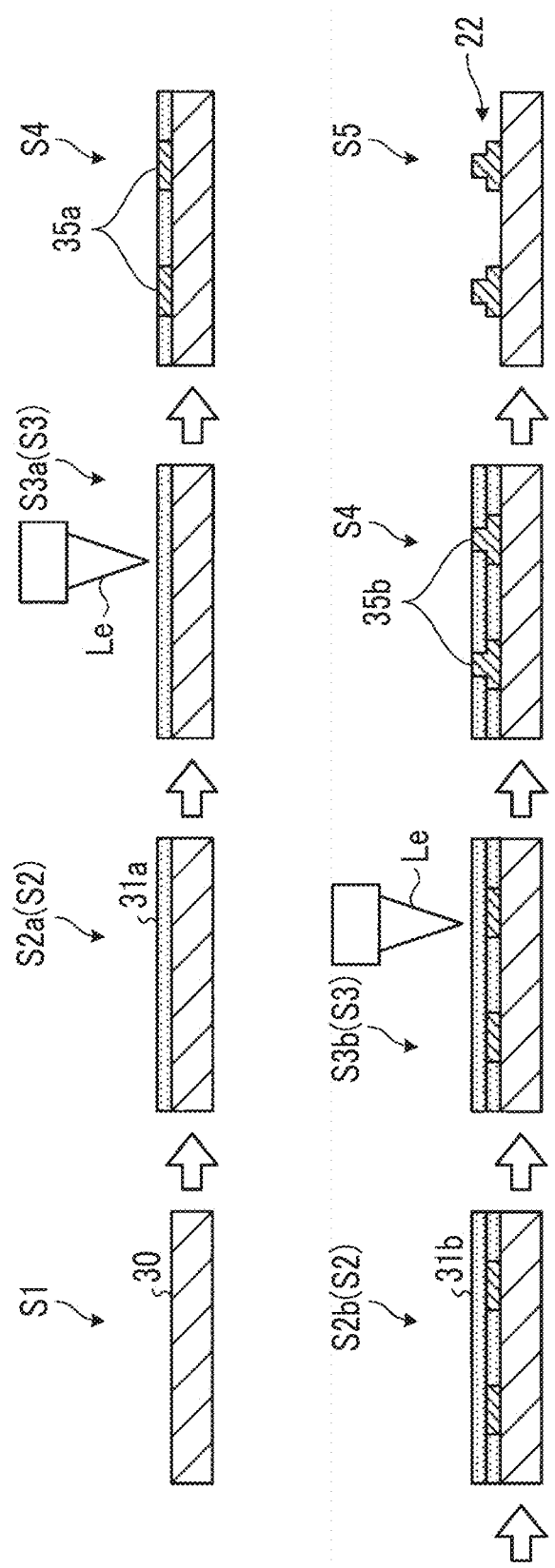
FIG. 2 is an explanatory view related to a method for constructing an abradable coating according to Embodiment 1.
Figure 3:
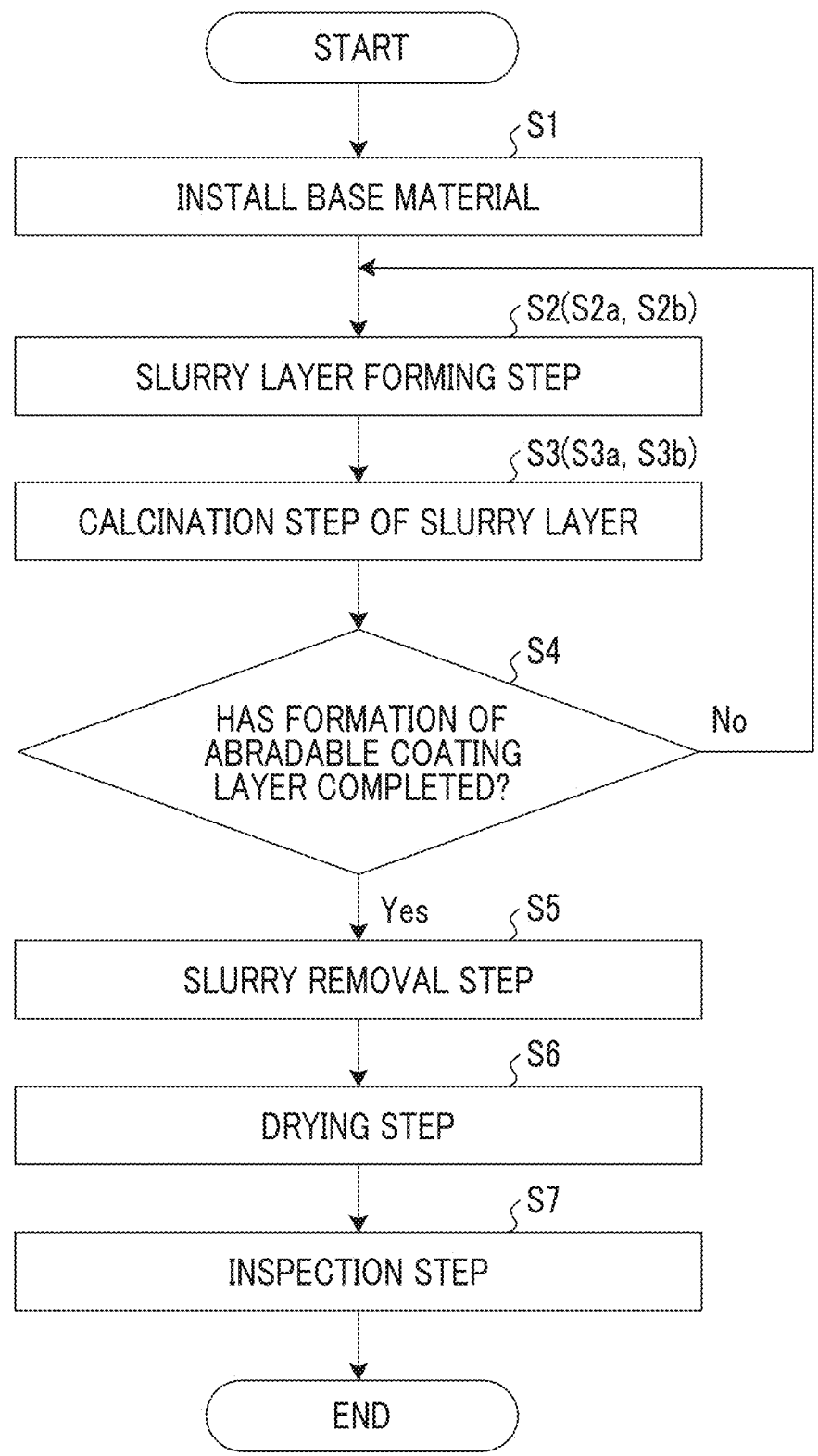
FIG. 3 is a flowchart related to the method for constructing an abradable coating according to Embodiment 1.
Figure 4:
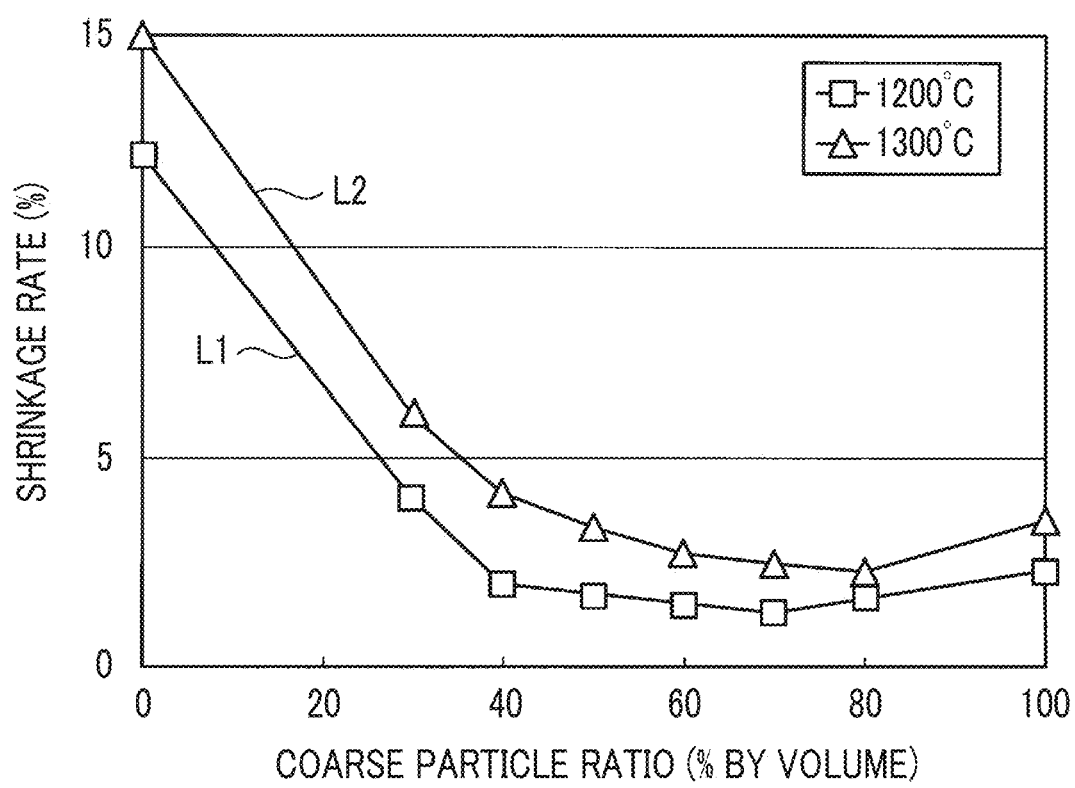
FIG. 4 is a graph illustrating a shrinkage rate which varies in accordance with a coarse particle ratio.
Figure 5:
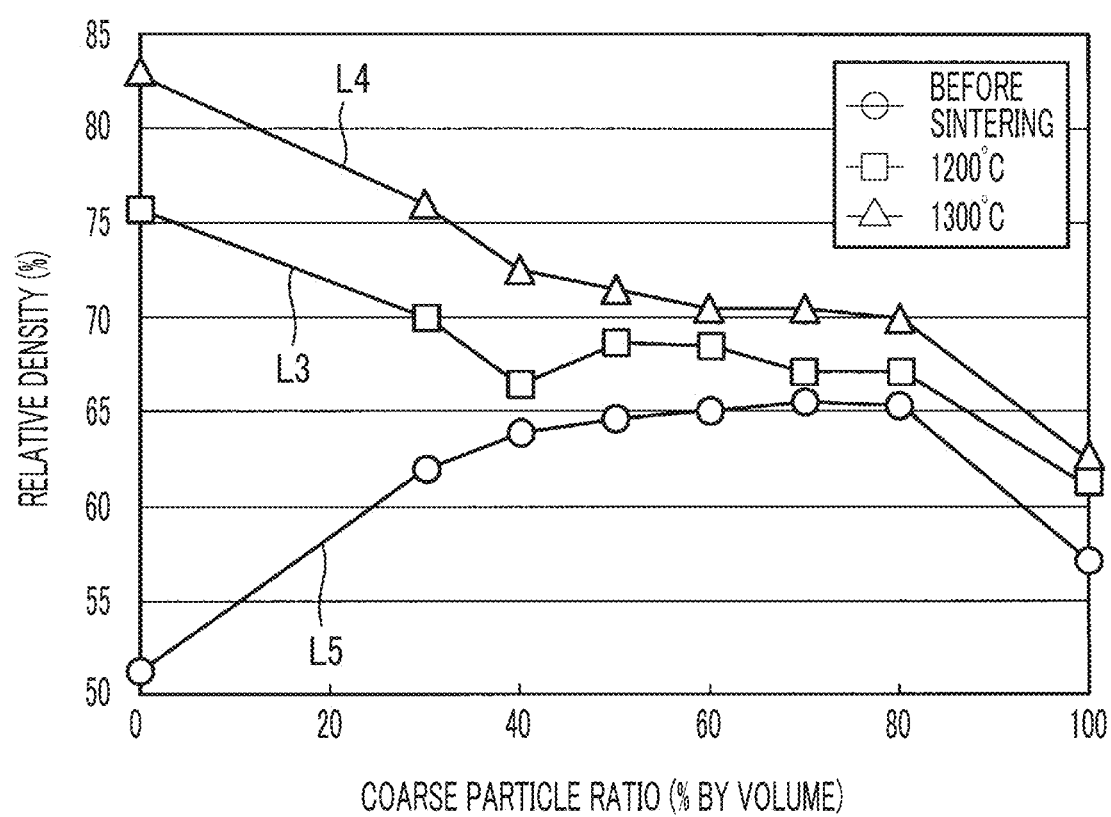
FIG. 5 is a graph illustrating a relative density which changes in accordance with the coarse particle ratio.

FIG. 1 is a schematic configuration view of a shroud on which an abradable coating is constructed by a construction method according to Embodiment 1. FIG. 2 is an explanatory view related to a method for constructing an abradable coating according to Embodiment 1. FIG. 3 is a flowchart related to the method for constructing an abradable coating according to Embodiment 1. FIG. 4 is a graph illustrating a shrinkage rate which changes in accordance with a coarse particle ratio. FIG. 5 is a graph illustrating a relative density which changes in accordance with the coarse particle ratio.

The method for constructing an abradable coating according to Embodiment 1 is applied to a shroud which is provided in a gas turbine, such as a gas turbine generator or a gas turbine engine, as a construction object. First, a shroud 10 will be briefly described prior to the method for constructing an abradable coating.

The shroud 10 is a casing provided to surround a radially outside of a plurality of rotor blades 11 that are arranged on a rotating shaft at predetermined intervals in a circumferential direction. For example, a high-temperature working fluid, such as combustion gas, circulates in the shroud 10, and the plurality of rotor blades 11 rotate around the rotating shaft by the working fluid. In other words, while the shroud 10 is a stationary member, the plurality of rotor blades 11 are rotatable members that rotate around the rotating shaft. Further, a clearance 15 is formed between the shroud 10 and each of the rotor blades 11 in a radial direction of the rotating shaft.

The shroud 10 includes a shroud body (base material) 20, a thermal barrier coating layer (ceramic layer) 21, and an abradable coating layer 22. The shroud body 20 is made of, for example, a heat-resistant metallic material, such as a Ni-based superalloy, and a cooling flow passage 25 is formed in the shroud body 20. A cooling medium, such as cooling air, circulates in the cooling flow passage 25 so as to cool the shroud body 20 that is heated by the high-temperature working fluid circulating in the shroud 10.

The thermal barrier coating layer (TBC: thermal barrier coating) 21 is formed on the surface of the shroud body 20, that is, the surface of the shroud body 20 facing the rotor blades 11. The thermal barrier coating layer 21 is formed of a porous ceramic layer to inhibit heat from being input to the shroud body 20 from the high-temperature working fluid.

A zirconia-based ceramic material, which is an oxide-based ceramic material, is used for the thermal barrier coating layer 21, and $ZrO_2$ is used for the thermal barrier coating layer 21 in this embodiment. The porosity of the thermal barrier coating layer 21 is in the range of, for example, 5% to 15%, and is 10% in this embodiment. The thermal barrier coating layer 21 is evenly formed on the surface of the shroud body 20 as a layer having a uniform thickness by, for example, ceramic spraying (APS: atmospheric plasma spraying).

The abradable coating layer 22 is formed on the surface of the thermal barrier coating layer 21. The abradable coating layer 22 is a seal material that is used to inhibit the working fluid from leaking from the clearance 15 formed between the shroud 10 and each rotor blade 11, and is subjected to free-cutting by each rotor blade 11. Since the abradable coating layer 22 is formed in the shape of a fin protruding from the thermal barrier coating layer 21, a predetermined pattern is formed on the thermal barrier coating layer 21. For example, a wavy fin is used as the pattern, but the shape of the pattern is not limited thereto and may be any shape that inhibits the working fluid from leaking.

The same type of ceramic material as the thermal barrier coating layer 21 is used for the abradable coating layer 22. For example, a zirconia-based ceramic material is used for the abradable coating layer 22, and $ZrO_2$ is used for the abradable coating layer 22 in this embodiment. The abradable coating layer 22 is formed by laminating a plurality of sintered layers 35. The porosity of each sintered layer 35 is, for example, in the range of 10% to 40%, and is 20% in the present embodiment. The abradable coating layer 22 is formed on the surface of the thermal barrier coating layer 21 by a method for constructing an abradable coating which will be described later.

In Embodiment 1, the plurality of sintered layers 35 are two layers, and include a first sintered layer 35a which is a sintered layer 35 formed to be in contact with the surface of the thermal barrier coating layer 21, and a second sintered layer 35b which is a sintered layer 35 formed to be in contact with the first sintered layer 35a (refer to FIG. 2). In addition, in Embodiment 1, the abradable coating layer 22 is configured with the two layers of sintered layers 35, but the number of layers is not particularly limited, and may be configured with two or more sintered layers 35.

Next, a method for constructing an abradable coating will be described with reference to FIGS. 2 and 3. In the construction method of the embodiment, the shroud body 20 on which the thermal barrier coating layer 21 is constructed is applied as a base material 30 and the abradable coating layer 22 is formed on the surface of the thermal barrier coating layer 21. In addition, in the embodiment, the shroud body 20 on which the thermal barrier coating layer 21 is constructed is applied as the base material 30, but the present invention is not limited to the configuration and a porous ceramic material may be applied as the base material 30.

Further, in the method for constructing an abradable coating of abradable coating of Embodiment 1, a case where the abradable coating layer 22 is formed by laminating the two sintered layers 35 will be described.

First, in the construction method of Embodiment 1, the base material 30 is installed at a predetermined position (step S1: base material installing step). In the base material installing step S1, the base material 30 is installed such that the shroud body 20 is on the lower side and the thermal barrier coating layer 21 is on the upper side.

Next, by using the slurry, a slurry layer 31 is formed on the surface of the thermal barrier coating layer 21 (base material 30) (step S2: slurry layer formation step). The slurry layer formation step S2 is repeated by the number of the sintered layers 35 to be laminated. In the slurry layer formation step S2, the slurry layer 31 is formed following the surface of the base material 30, the slurry is applied on the surface of the base material 30, for example, by screen printing or the like, and accordingly, the slurry layer 31 is formed. Therefore, in the slurry layer formation step S2, a slurry layer 31 having a uniform thickness is formed even when the surface of the base material 30 is a curved surface.

In Embodiment 1, the slurry layer formation step S2 is performed two times in accordance with the two sintered layers 35. Specifically, in the slurry layer formation step S2, an initial (first) slurry layer formation step S2a which is the first slurry layer formation step S2 and a second slurry layer formation step S2b which is the last (second) slurry layer formation step S2 are performed. In the first slurry layer formation step S2a, a first slurry layer 31a which is the slurry layer 31 that is in contact with the surface of the base material 30 is formed. The first slurry layer 31a is partially sintered in a calcination step which will be described later, and thus, the first slurry layer 31a becomes the first sintered layer 35a. In addition, in the second slurry layer formation step S2b, a second slurry layer 31b which is the slurry layer 31 that is in contact with the first slurry layer 31a is formed. The second slurry layer 31b is partially sintered in the calcination step which will be described later, and thus, the second slurry layer 31b becomes the second sintered layer 35b.

Here, the slurry, which is used in the slurry layer formation step S2, will be described. The slurry contains ceramic particles, a solvent, a binder, and a dispersant.

The ceramic particles include coarse particles and fine particles, and zirconia-based (for example, $ZrO_2$) ceramic particles are used as either particles in Embodiment 1. In a case where the volume of the coarse particles is denoted by V1 and the volume of the fine particles is denoted by V2, a ratio (V1/V2) of the volume of the coarse particles to the volume of the fine particles satisfies the range of "50/50≤V1/V2≤90/10". Further, the average particle size of the coarse particles is in the range of 1 μm to 10 μm, and the coarse particles having an average particle size of 3.4 μm are used in Embodiment 1. The average particle size of the fine particles is in the range of 0.01 μm to 1 μm, and fine particles having an average particle size of 0.1 μm are used in this embodiment.

For example, water, such as distilled water, is used as the solvent, and the solvent is mixed such that the volume concentration of the ceramic particles in the slurry is in the range of 20 to 60 vol %. Since water, which is harder to be volatilized than other solvents, such as alcohol, is used as the solvent in this embodiment, a change in the viscosity or the like of the slurry over time is inhibited.

For example, polyvinyl alcohol (PVA) is used as the binder, and the binder is mixed so that the percentage by mass of the binder is in the range of 1 to 10 wt % with respect to the mass of the ceramic particles. For example, an ammonium salt of a polycarboxylic acid is used as the dispersant, and the dispersant is mixed so that the percentage by mass of the dispersant is in the range of 0.1 to 0.5 wt % with respect to the mass of the ceramic particles.

In the slurry, proportions of the coarse particles and the fine particles are different from each other in the first slurry layer formation step S2a and the second slurry layer formation step S2b. Specifically, the slurry used in the first slurry layer formation step S2a has a smaller proportion of the coarse particles and the greater proportion of the fine particles than that of the slurry used in the second slurry layer formation step S2b. This is for enhancing the adhesiveness of the first sintered layer 35a with respect to the surface of the base material 30. Meanwhile, the slurry used in the second slurry layer formation step S2b has a greater proportion of the coarse particles and the smaller proportion of the fine particles than that of the slurry used in the first slurry layer formation step S2a. This is to enhance the free-cutting ability of the second sintered layer 35b by the rotor blades 11.

Here, with reference to FIGS. 4 and 5, changes in shrinkage rate and relative density of the slurry that changes in accordance with the coarse particle ratio will be described. In FIG. 4, the horizontal axis represents the coarse particle ratio, and the vertical axis represents the shrinkage rate. A line L1 of the square (□) in white in FIG. 4 is a line indicating the shrinkage rate of the slurry when the sintering temperature of the slurry is 1200° C., and a line L2 of the triangle (Δ) in white in FIG. 4 is a line indicating the slurry shrinkage rate when the sintering temperature of the slurry is 1300° C. In FIG. 5, the horizontal axis represents the coarse particle ratio, and the vertical axis represents the relative density. The coarse particle ratio is a proportion of coarse particles with respect to the fine particles and the coarse particles. The relative density is a particle filling factor of ceramic particles. A line L3 of the square (□) in white in FIG. 5 is a line indicating the relative density of the slurry when the sintering temperature of the slurry is 1300° C., a line L4 of the triangle (Δ) in white in FIG. 5 is a line indicating the relative density of the slurry when the sintering temperature of the slurry is 1200° C., and a line L5 of a ring (Δ) in white in FIG. 5 is a line indicating the relative density before the sintering of the slurry.

When the shrinkage rate of the slurry is 5% or more, separation from the surface of the base material 30 or the adjacent sintered layer 35 is likely to occur. As illustrated in FIG. 4, the slurry has a coarse particle ratio of 40% or more and a shrinkage of less than 5% when the sintering is performed at 1300° C. In addition, the slurry has a range including the minimum shrinkage rate when the coarse particle ratio is between 50% and 80%.

In addition, as illustrated in FIG. 5, the slurry has a range including the maximum relative density when the coarse particle ratio between the sintering is between 50% and 80%. In addition, in the slurry, the relative density decreases when the coarse particle ratio becomes greater than 80%.

Based on FIGS. 4 and 5, in Embodiment 1, any of the slurry used in the first slurry layer formation step S2a and the second slurry layer formation step S2b which has the coarse particle ratio of 50% or more is applied. In addition, the slurry used in the first slurry layer formation step S2a which has the coarse particle ratio of approximately 50% is applied, and the slurry used in the second slurry layer formation step S2b which has the coarse particle ratio of 70% to 80% is applied.

Again, with reference to FIGS. 2 and 3, when the slurry layer 31 is formed on the surface of the base material 30 in the slurry layer formation step S2 using the slurry, the slurry layer 31 is sintered, and the sintered layer 35 to be a part of the abradable coating layer 22 is formed (step S3: calcination step). In the calcination step S3, the slurry layer 31 is irradiated with laser Le, and the slurry layer 31 is sintered. In a case of sintering the slurry layer 31 using the laser Le, the sintered layer 35 having a predetermined shape is formed by scanning the laser Le with a plurality of passes by a moving mechanism (not illustrated).

In Embodiment 1, similar to the slurry layer formation step S2, the calcination step S3 is performed two times in accordance with the two sintered layers 35. Specifically, in the calcination step S3, an initial (first) calcination step S3a which is the first calcination step S3 and a second calcination step S3b which is the last (second) calcination step S3 are performed. In the first calcination step S3a, the first slurry layer 31a formed in the first slurry layer formation step S2a is irradiated with laser Le, the first slurry layer 31a is sintered, and accordingly, the first sintered layer 35a is formed. In addition, in the second calcination step S3b, the second slurry layer 31b formed in the second slurry layer formation step S2b is irradiated with laser Le, the second slurry layer 31b is sintered, and accordingly, the second sintered layer 35b is formed.

When the sintered layer 35 is formed, it is determined whether or not the sintered layer 35 has reached a predetermined number of layers (two layers in Embodiment 1) that configure the abradable coating layer 22 (step S4). In other words, in step S4, it is determined whether or not formation of the abradable coating layer 22 is completed. In a case where it is determined that the formation of the abradable coating layer 22 is not completed (step S4: No), the process moves to the slurry layer formation step S2 again, and then, the calcination step S3 is performed. In addition, the slurry layer formation step S2 and the calcination step S3 are repeated until reaching the predetermined number of layers.

In addition, the second sintered layer 35b is formed such that the width (left-right direction in FIG. 2) in the orthogonal plane orthogonal to a laminating direction is narrower than the width of the first sintered layer 35a. In addition, in the above-described calcination step S3, a reference point for positioning is set on the base material 30, the movement of the laser Le is controlled based on the reference point, and accordingly, the first sintered layer 35a and the second sintered layer 35b are formed to be superimposed in the laminating direction.

In a case where it is determined that the formation of the abradable coating layer 22 is completed (step S4: YES), extraneous slurry on the base material 30 is removed using a solvent (for example, water) contained in the slurry (step S5: slurry removal step). In other words, in the slurry removal step S5, the base material 30 on which the abradable coating layer 22 is formed is washed with water to remove the non-sintered slurry.

After removing the slurry, the base material 30 on which the abradable coating layer 22 is formed is dried (step S6: drying step). In the drying step S6, the solvent adhered to the base material 30 is volatilized through natural drying or drying by heating.

After drying the base material 30, the abradable coating layer 22 formed on the base material 30 is inspected (step S7: inspection step). In the inspection step S7, it is determined whether or not the shape of the fin of the abradable coating layer 22 has a predetermined shape by visual observation or image processing or the like. In addition, the inspection step S7 may be performed after the calcination step S3.

As described above, according to Embodiment 1, after the slurry layer 31 is formed on the base material 30, the sintered layer 35 is formed by appropriately sintering the slurry layer 31, the sintered layer 35 is laminated by repeating the formation of the sintered layer 35, and accordingly, it is possible to form the abradable coating layer 22 on the surface of the base material 30. At this time, even when the surface of the base material 30 is a curved surface, a concave surface, or a convex surface, by using the slurry, it is possible to form the slurry layer 31 which becomes a uniform layer with respect to the surface of the base material 30. As described above, since the abradable coating layer 22 having high free-cutting ability can be formed by simple steps, the construction of an abradable coating can be streamlined.

In addition, according to Embodiment 1, by using slurry having a small proportion of the coarse particles and a large proportion of the fine particles in the first slurry layer 31a, the first sintered layer 35a after sintering the first slurry layer 31a can be formed to have high adhesiveness on the base material 30. In addition, by using slurry having a large proportion of the coarse particles and a small proportion of the fine particles in the second slurry layer 31b, the second sintered layer 35b after sintering the second slurry layer 31b can be formed to have high free-cutting ability.

Further, according to Embodiment 1, by using the laser Le, it is possible to form the sintered layer 35 with high accuracy, and accordingly, it is possible to form the abradable coating layer 22 having the shape of the fin with high accuracy.

Further, according to Embodiment 1, it is possible to remove extraneous slurry on the base material 30 by using the solvent. Therefore, by appropriately adding or drying the ceramic particles, the slurry removed by the solvent can be reused as slurry usable in the slurry layer formation step S2.

Further, according to Embodiment 1, it is possible to determine whether or not the abradable coating layer 22 formed on the base material 30 is appropriately formed by performing the inspection step S7 after the drying step S6.

In addition, according to Embodiment 1, the thermal barrier coating layer 21 and the abradable coating layer 22 can be firmly joined to each other. In other words, since the thermal barrier coating layer 21 is porous, as the solvent contained in the slurry enters the pores of the thermal barrier coating layer 21, the ceramic particles are flocculated on an interface between the thermal barrier coating layer 21 and the slurry, and as the slurry layer is calcinated in this state, the thermal barrier coating layer 21 and the abradable coating layer 22 are firmly joined to each other.

In addition, in Embodiment 1, the laser Le is used in the calcination step S3, but the slurry layer 31 may be sintered by a frame, such as a burner or a microplasma.

In addition, in the method for constructing an abradable coating according to Embodiment 1, in order to further improve the free-cutting ability of the abradable coating layer 22, it is more preferable to form the pores in the abradable coating layer 22. In addition, a pore forming material may be contained in the slurry used in Embodiment 1. In other words, multiple pores can be formed in the abradable coating layer 22 by oxidation or volatilization of the pore forming material at the time of sintering the slurry layer 31, it is possible to further improve the free-cutting ability. In the pore forming material, at least one of a polymer-based material and a carbon-based material is contained, and other materials may be used as long as pores can be formed at the time of sintering the slurry layer 31.

In addition, in Embodiment 1, the abradable coating layer 22 is made of a zirconia-based ceramic material which is the same type of the thermal barrier coating layer 21, but in a case where the thermal barrier coating layer 21 is an EBC coating, a rare earth silicate, BSAS or alumina-based ceramic material may be used. Specifically, among the ceramic particles contained in the slurry, mulite-based ceramic particles may be used for the coarse particle and the alumina-based ceramic particles may be used for the fine particle.

Embodiment 2

Figure 6:
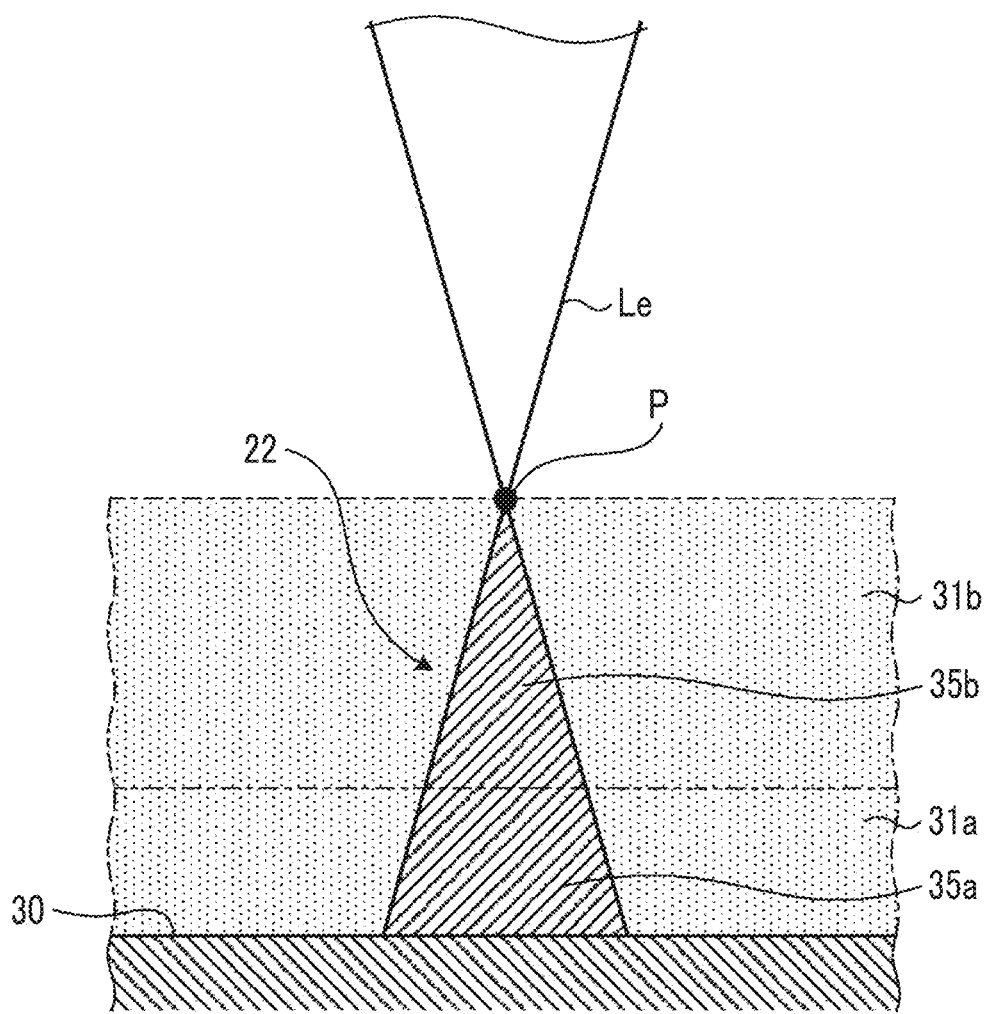
FIG. 6 is an explanatory view related to a method for constructing an abradable coating according to Embodiment 2.

Next, a method for constructing an abradable coating according to Embodiment 2 will be described with reference to FIG. 6. In addition, in Embodiment 2, parts different from Embodiment 1 will be described in order to avoid overlapping description, and parts having the same configuration as in Embodiment 1 will be described with the same reference numerals. FIG. 6 is an explanatory view related to the method for constructing an abradable coating according to Embodiment 2.

The method for constructing an abradable coating of Embodiment 2 has a different thickness in the laminating direction of the slurry layer 31 formed in the slurry layer formation step S2 of Embodiment 1. In addition, in the method for constructing an abradable coating according to Embodiment 2, a focal position P of the laser Le irradiated in the calcination step S3 of Embodiment 1 is a surface of the abradable coating layer 22.

Specifically, in the slurry layer formation step S2 of Embodiment 2, the thickness of the first slurry layer 31a formed in the first slurry layer formation step S2a is formed to be thinner than the thickness of the second slurry layer 31b formed in the second slurry layer formation step S2b. In other words, even in a case of forming the plurality of slurry layers 31 (three or more layers), the thickness of at least the first slurry layer 31a is formed to be thinner than that of the second slurry layer 31b. Therefore, the thickness of the first sintered layer 35a formed by sintering the first slurry layer 31a is also thinner than the thickness of the second sintered layer 35b formed by sintering the second slurry layer 31b. In other words, the thickness of the second sintered layer 35b is thicker than the thickness of the first sintered layer 35a.

In addition, in the calcination step S3 of Embodiment 2, the focal position P of the laser Le is positioned on the surface of the abradable coating layer 22, that is, at the tip end portion in the protruding direction of the shape of the fin (laminating direction). In other words, in Embodiment 2, in the first calcination step S3a, the focal position P of the laser Le is in an off-focus state being separated from the surface of the first slurry layer 31a, the first slurry layer 31a is irradiated with the laser Le, and the first slurry layer 31a is sintered. Meanwhile, in the second calcination step S3b, in a state where the focal position P of the laser Le is positioned on the surface of the second slurry layer 31b, the second slurry layer 31b is irradiated with the laser Le, and the second slurry layer 31b is sintered.

As described above, according to Embodiment 2, since the first slurry layer 31a can be made thin, heating in the thickness direction (laminating direction) of the first slurry layer 31a in the first calcination step S3a can be appropriately performed, and the first sintered layer 35a can be appropriately formed. In addition, since the first sintered layer 35a obtained by sintering the first slurry layer 31a can be made thin and the second sintered layer 35b obtained by sintering the second slurry layer 31b can be made thick, it is possible to increase the thickness of the second sintered layer 35b having high free-cutting ability in the thickness direction of the abradable coating layer 22 and to further improve the free-cutting ability.

In addition, according to Embodiment 2, by achieving a state where the focal position P of the laser Le is set on the surface of the abradable coating layer 22, the focal position P of the laser Le is in an off-focus state being separated from the surface of the first slurry layer 31a. In addition, by irradiating the first slurry layer 31a with the laser Le in this state, it is possible to irradiate a wide region of the first slurry layer 31a with the laser Le, and thus, the first sintered layer 35a can be formed with a small number of passes. In addition, since there is no need to move the focal position P of the laser Le, it is possible to streamline the calcination step S3.

REFERENCE SIGNS LIST

10: shroud
11: rotor blade
15: clearance
20: shroud body
21: thermal barrier coating layer
22: abradable coating layer
25: cooling flow passage
30: base material
31: slurry layer
31a: first slurry layer
31b: second slurry layer
35: sintered layer
35a: first sintered layer
35b: second sintered layer
Le: laser
P: focal position

The invention claimed is:

1. A method for constructing an abradable coating on a shroud, comprising:
    a first slurry layer formation step of forming a first slurry layer on a surface of a base material by using a slurry that contains ceramic particles and a solvent;
    a first sintering step of forming a first sintered layer to be a portion of an abradable coating layer by partially sintering the first slurry layer that is formed on the surface of the base material using a laser;
    a second slurry layer formation step of forming a second slurry layer on a surface of the first slurry layer by using a slurry that contains ceramic particles and a solvent;
    a second sintering step of forming a second sintered layer to be another portion of the abradable coating layer by partially sintering the second slurry layer that is formed on the surface of the first slurry layer using the laser; and
    a slurry removal step of removing a non-sintered slurry of the first slurry layer and the second slurry layer after forming the abradable coating layer in which the first and second sintered layers are laminated on the surface of the base material,
    wherein the ceramic particles include coarse particles having a large particle size and fine particles having a particle diameter smaller than that of the coarse particles,
    wherein the slurry used in the first slurry layer has a smaller proportion of the coarse particles than that of the slurry used in the second slurry layer, and
    wherein in the first sintering step, the first slurry layer is irradiated with the laser,
    a focal position of the laser is set to be the surface of the abradable coating layer, and
    in an off-focus state where the focal position of the laser is separated from the surface of the first slurry layer, the first slurry layer is irradiated with the laser, and the first slurry layer is partially sintered.

2. The method for constructing the abradable coating according to claim 1,
    wherein a thickness of the first slurry layer is formed to be thinner than that of the second slurry layer.

3. The method for constructing the abradable coating according to claim 1,
    wherein, in the slurry removal step, by using the solvent, the non-sintered slurry is removed.

4. The method for constructing the abradable coating according to claim 1,
    wherein the slurry further contains a pore forming material.

5. The method for constructing the abradable coating according to claim 4,
    wherein the pore forming material contains at least one of a carbon-based material and a polymer-based material.

6. The method for constructing the abradable coating according to claim 1, further comprising:
    an inspection step of inspecting the abradable coating layer formed on the base material after the slurry removal step.

7. The method for constructing the abradable coating according to claim 1,
    wherein a porous ceramic layer is formed on the surface of the base material, and
    wherein, in the slurry layer formation step, the slurry layer is formed on the ceramic layer by using the slurry.

* * * * *